(12) United States Patent
Stahn

(10) Patent No.: US 8,146,506 B2
(45) Date of Patent: Apr. 3, 2012

(54) ACTIVE RAIL TRANSPORT SYSTEM

(76) Inventor: Uwe Stahn, Berlin (DE)

( * ) Notice: Subject to any disclaimer, the term of this patent is extended or adjusted under 35 U.S.C. 154(b) by 105 days.

(21) Appl. No.: 12/298,463

(22) PCT Filed: Apr. 29, 2007

(86) PCT No.: PCT/DE2007/000798
§ 371 (c)(1),
(2), (4) Date: Oct. 24, 2008

(87) PCT Pub. No.: WO2007/124740
PCT Pub. Date: Nov. 8, 2007

(65) Prior Publication Data
US 2009/0235839 A1  Sep. 24, 2009

(30) Foreign Application Priority Data
Apr. 30, 2006 (DE) .......................... 10 2006 020 546

(51) Int. Cl.
*B61J 3/00* (2006.01)
(52) U.S. Cl. .................. 104/88.01; 104/130.07
(58) Field of Classification Search .................. 104/33, 104/88.01, 88.02, 88.03, 88.04, 130.01, 130.07, 104/295; 246/187 A
See application file for complete search history.

(56) References Cited

U.S. PATENT DOCUMENTS

| 3,430,580 | A | * | 3/1969 | Edens | 104/28 |
| 3,799,062 | A | * | 3/1974 | Stocker | 104/105 |
| 3,901,160 | A | * | 8/1975 | Auer, Jr. | 104/130.07 |
| 4,203,369 | A | * | 5/1980 | Perrott | 104/130.07 |
| 5,289,778 | A | * | 3/1994 | Romine | 104/88.04 |
| 5,778,796 | A | * | 7/1998 | Kim | 104/130.07 |
| 5,797,330 | A | * | 8/1998 | Li | 104/28 |
| 5,992,575 | A | * | 11/1999 | Kim | 188/38 |
| 2009/0235839 | A1 | * | 9/2009 | Stahn | 104/88.01 |

FOREIGN PATENT DOCUMENTS

DE     10253485 C1 * 12/2003

* cited by examiner

*Primary Examiner* — Joe Morano, IV
*Assistant Examiner* — Jason C Smith
(74) *Attorney, Agent, or Firm* — Notaro, Michalos & Zaccaria P.C.

(57) ABSTRACT

An active rail transport system for the automated transport of persons or goods on conventional rails includes a car having an autonomous drive unit, brake and steering mechanism. The car may be directed away from a running through car, decelerated unloaded and/or loaded and thereafter redirected to the running through car after the speed of the car is adjusted to the speed of the running through car. A first conducting system which includes a first scanning system provides continuous traction. The first scanning system can be adjusted to account for different rail gauges during travel. A second conducting system includes scanning systems and associated guide rails for determining the direction of the car when going over diverge points and crossings.

9 Claims, 3 Drawing Sheets

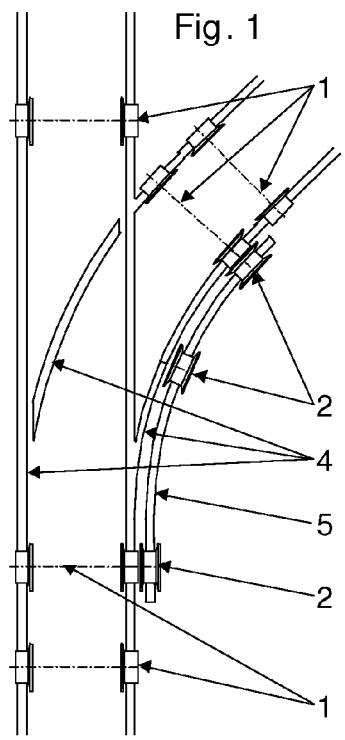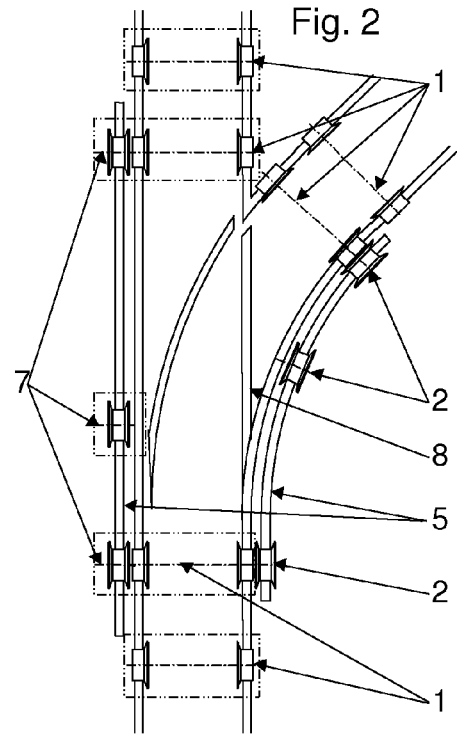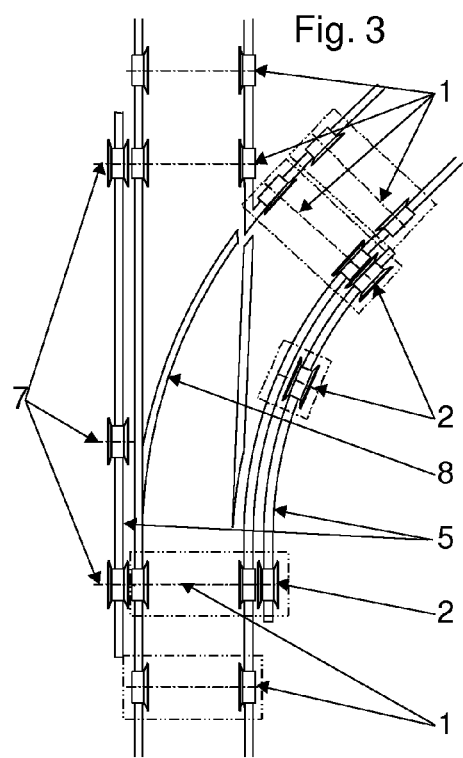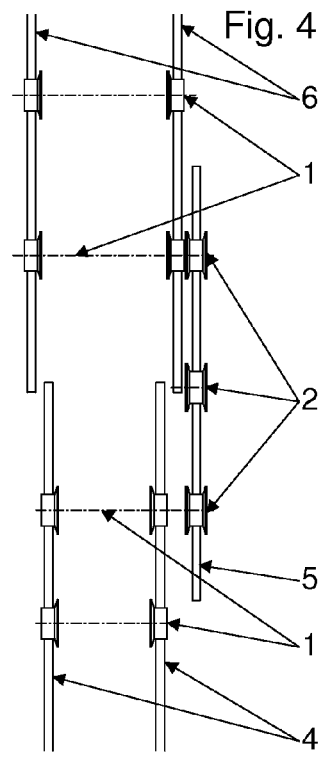

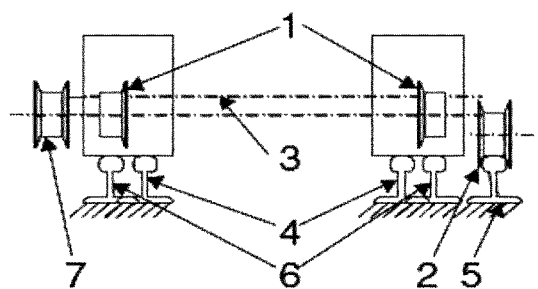
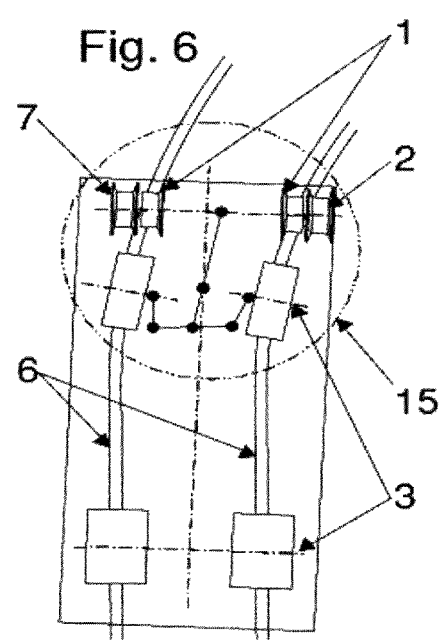
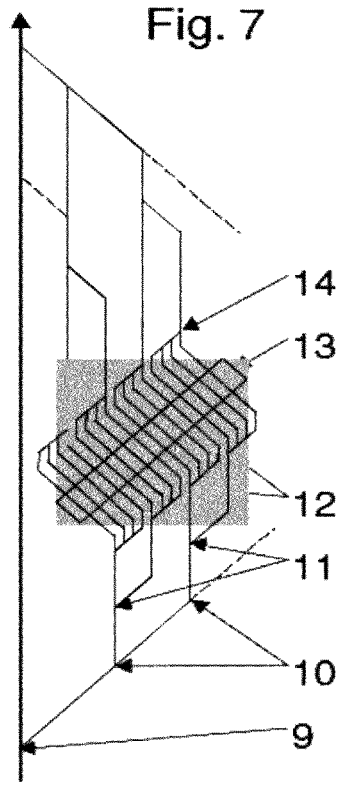

ACTIVE RAIL TRANSPORT SYSTEM

FIELD AND BACKGROUND OF THE INVENTION

The invention relates to a public rail transport system for individually transporting persons or goods in an automated manner on conventional rails without using a conductor, in which two automatically controlled conducting systems are arranged such that individual cars that have an autonomous drive unit, brake, and steering mechanism, can be directed away from the rolling convoy (train), be decelerated, unloaded and/or loaded by merely changing the conducting system that mechanically influences the steering mechanism, lowering and lifting an associated scanning system, and can be redirected into a rolling convoy (train) at a different point after the speed of the individual cars has been adjusted to the speed of the convoy, wherein the first conducting system, which comprises a first scanning system on each car and on the conventional rails, is used for providing continuous traction, and the second conducting system, comprising a second scanning system arranged next to the first scanning system on each car and on the additional guidance rails installed on the side next to the conventional rails determines the direction when going over points.

Such a transport system is known from patent DE 102 53 485 C1. It runs, like the Sprinter, without intermediate stop but in small units, automatically and individually, to each train station of the network. The individual units can be optimised for different requirements. Thus, e.g., there can be units able to carry approximately 8 persons and one car, or, alternatively, goods. It combines the advantages of individual traffic on a motorway with the guidance of the rail. The result is an automatic public means of transport without conductor whereby the existing rail is responsible for the steering. There is no need for overtaking since all cars are running with the same speed of, e.g., 200 km/h. Passengers or goods with a common destination book a car to a specific train station, board and indicate their destination. If there is a starting window (like for aeroplanes), they are accelerated to the system speed and can then be integrated in the flowing traffic, individually or in groups. This patent also allows that they can roll out of the flowing traffic individually or in groups at their final destination.

Because the outer scanning system always lifts or lowers, respectively, both scanning wheels at the same time, it does not work, however, that it is possible to drive at one position to the left, to the right, or straight—which is important for junctions and crossings of railway lines. In a mixed operation with today's trains it is also not possible to go over an active point and to freely determine the direction. Changing the track gauge during the ride is also not possible with this system. Since in different countries the rails have a different width, it is currently necessary to change the train, or the cars are adjusted at low speed to the other track gauge.

SUMMARY OF THE INVENTION

It is the object of the invention, hereinafter called "synchrotrain" to eliminate the disadvantages of the prior art.

The object is solved by means of the features of the first patent claim.

Advantageous further developments and embodiments are subject matter of the sub-claims.

For the operation of the synchrotrain, four essential parts are necessary.

The cars running on the existing network. They can belong to different owners. This is similar to houses which belong to different landlords, or owners or community associations, respectively.

The network on which the synchrotrain can run. This also can belong to different owners, in successional sectors or in sub-sectors.

The train stations can be operated independently. For example, as airports are operated today.

The control and hence the control centres have the most important role. Like air traffic controllers today they have to provide for smooth traffic, however, fully automatic. They monitor the traffic in a certain sector, communicate with the adjacent control centres, and are responsible for the regional utilisation ratio.

The cars can be produced by any manufacturer. However, for the operation of the synchrotrain it is necessary that they all meet a catalogue of requirements. In addition to general requirements, for different total weights and air drags, the same substantially specifies the corresponding motor capacity.

In principle, everybody can purchase such a car and provide it for public traffic (more details below). This person, however, is also responsible for maintenance and cleaning. Similar to the administration of apartments of different owners, an administration of maintenance and cleaning of the cars is also thinkable.

The cost of the usage should be divided in two portions. That is, a charge for providing the car, depending on the type of car, and a charge for the distance, depending on the load to be transported.

The current railway network requires only minor modifications for the operation of the synchrotrain:
  Construction of special train stations (more details below) comprising passive points
  Upgrading of several active points with external guidance tracks to combined points
  Adjustments of crossings of tracks and branch-offs to the high speeds
  Extension of the structure gauge in the track and current collector sector
  Elimination of crossings with roads
  Addition of reporting facilities in tunnels and in the mountains (more details below)

For acceleration, at ascending slopes, and for deceleration, linear motors installed in the track can be used. Thereby, the additional power is installed exactly where it is required and does not have to be carried along as unused load.

As with the cars, there can be different owners for the individual network sections. They are responsible for the functionality of all devices in their sector and determine the cost per car and traveled distance, or negotiate all-inclusive prices with the vehicle administrations.

The train stations are only suitable for the synchrotrain, and are owned by operators or operating companies which charge train station fees for the provision of logistics, for unloading and loading, as well as for the execution of security and custom inspections.

All control centres are networked with each other, and each of them operates independently. They have interfaces to the respective adjacent control centres and the train station located within their sector. In the control centres, the route of a car, in particular at crossings, junctions, and train stations is calculated and is booked upon confirmation of the customer (more details below), and is monitored after start of the journey. They provide for the network being used to ⅔ of its capacity only since otherwise the network could break down in case of a malfunction. It is possible that this capacity can increase through relevant experience with the system.

The network operators and train station operators will be charged with the cost.

For a reliable control of the synchrotrain, two independent control systems are necessary. There is a central one with the control centres (see above) for network planning and monitoring, and a control of the car depending on the car running ahead or behind (more details below).

For each car, the entire route is calculated before start of the journey, and the required position on the respective track section is reserved. This is possible by means of the constant speed in the entire network. Hence, any stop or even braking on the way is eliminated. Of course, the cars must be provided with a toilet, and in case of intercontinental journeys (Europe-Asia-Africa or North and South America, respectively,) with sleeping and sanitary facilities. For food supply, supply vehicles can drive in parallel, as during the change of the voltage transformer.

After the start, the cars communicate with the respective centre only if there are deviations from the plan. There, information is generated and sent (e.g. GSM) to all cars affected by these deviations.

Since in tunnels or in a mountainous environment, a communication via radio is not possible, a HF modulation of the power supply and the transmission via cable could establish a safe connection.

For controlling the cars, a GPS is not necessary. The available routes are fixed, and the respective position thereon can take place by path measurement. This is necessary anyway for maintaining the speed. After each branch-off, there is a reference point which calibrates the vehicles. The same also serves for the central system to calculate the network utilisation.

Each car sends deviations from the plan not only to the central system (see above) but also to its successor (e.g. by GSM). The information about its successor is provided by the central system for the respective track section. Since the direct radio connection to the successor in tunnels or mountainous environment is partially not possible, again a HF modulation of the power supply, or a local radio system could transmit the information to the successor and predecessor.

The enquiry for a train ride can take place by phone, internet, mobile phone, at the train station, or in the car itself (for changing the destination). For this, information about start, destination, type of car, time, or time window is necessary.

Start and destination station, or a start or destination area, respectively, are precisely selectable. Thus, the customer can consider the different prices of the different network and train station operators for his selection.

The enquiry is made available for all vehicle administrations. The same can provide one or more offers within seconds which will be approved in each case by the control centres, and the booking of the route will be marked in the system as "offered".

For soliciting of offers, there are four modes:
With or without reservations, marked as "offered"
Offers are reserved until selection (possibly with cost), or not reserved
The customer selects an offer and books unless somebody else has booked in the meantime.

By means of special prices, the cost for operational rides, e.g. to a work shop for maintenance, can be reduced. Since the cost depends on the weight, the final price can be determined only after completed loading, hence after the start.

The trains for the conventional system only have to run with a constant speed on a track on which the synchrotrain is already in operation, and have to carry the necessary communication devices.

The advantage of this invention is the dramatic reduction of stop and waiting times as well as the reduction of energy cost. Enormous energy and cost savings are possible in that, based on the functional principle, similar to today's trains, crush zones, airbags, crash protection and a passenger safety cell, as in the automotive field, can be omitted. The individual car is decelerated and accelerated only when it is being unloaded or loaded. Moreover, it is much lighter then comparable automobiles. Thereby, the energy cost is decreased again. The drive motors can be optimised individually for a constant rotational speed with respect to the respective maximum load per car to be transported. They just have to be able to compensate for load changes caused by wind. Accelerations which are necessary only in the area of train stations, or higher loads caused by ascending slopes can be handled or compensated, respectively, by means of external linear motors. Thereby heavy control gears can be eliminated. The energy from deceleration, which takes place only in the area of train stations or at slopes, can be stored as potential energy, and/or can be made available via linear generators to the starting cars or the oncoming traffic, respectively.

Hence, there are no unnecessary stop times, accelerations or decelerations. The synchrotrain is hence similar to today's Sprinter; however, the synchrotrain approaches every point of the network without any stop and as far as the mainland reaches. Since the length of the trains is not restricted any more due to the direct drive of each car, the capacity of the tracks is better utilised. The investment cost for a new individual means of transport can hardly be lower since there are no new tracks or routes to be built.

BRIEF DESCRIPTION OF THE DRAWINGS

Now the invention is explained by means of drawings.
In the figures shows
FIG. 1: A passive point
FIG. 2: An active point in the state straight forward
FIG. 3: An active point in the state turn
FIG. 4: Mechanism for changing the track gauge
FIG. 5: Carrying wheels on two track gauges
FIG. 6: Schematic sketch of the undercarriage of a car comprising a steered axle
FIG. 7: Basic sketch of a train station

DETAILED DESCRIPTION

Figure 8:
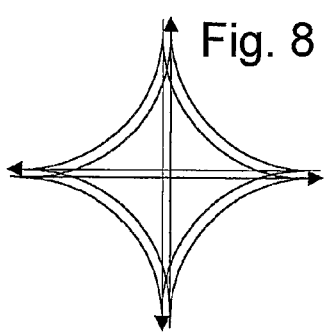
FIG. 8: Crossing of two tracks without the need for the cars to decelerate

To be able to roll to the left, to the right, and straight forward there are not only two but three scanning systems 1, 2, 7 which can be lifted and lowered independent from each other. Today's cars as well as the cars of the synchrotrain run straight forward over the passive point of FIG. 1 due to the wheel construction or the active first scanning system 1, respectively, without being affected in any way by the existence of the passive point.

Turning or merging is only possible when the car possesses the scanning systems which can be lifted and lowered independently from each other. For turning, a car approaches with active first scanning system 1. In the sector of the passive point, it lowers, e.g. the right scanning system 2. When the same has signalled operativeness, the first scanning system 1 is lifted. The right scanning system 2 is now active and directs the car away from the conventional track. When the car has passed the last intersection of the tracks, the first scanning system 1 is lowered again. When this one now has signalled operativeness, the right scanning system 2 is now lifted again, and the car acts again like conventional cars. When merging, the same sequence takes place the other way round.

For the mixed operation of today's trains and the cars of the synchrotrain, each of the active points must be equipped on the right and on the left with an additional guidance rail 5, see FIG. 2 and FIG. 3. These guidance rails do not affect today's trains. However, it allows each car of the synchrotrain to determine individually its direction, completely independent from the switching status of the active point, and even during switching of the same. For this, a car only has to lower the right or the left scanning system 2, 7 and subsequently lift the first scanning system 1. Shortly before the end of the combined point, the first scanning system 1 has to be lowered again, and the right one or the left one, respectively, has to be lifted again. The rectangles with dotted lines in FIGS. 2 and 3 show the scanning systems 1, 2 and 7 in their lowered position.

To be able to execute a change of the track gauge at full operational speed, the first scanning system is equipped with the possibility to change the distance of the two scanning wheels 1 to each other in the lifted state, FIG. 4.

When a car of the synchrotrain comprising an active first scanning system 1 approaches the end of a track gauge and reaches the sector of the changing mechanism or guidance rail 5, shown in FIG. 4, then it puts down the right or left scanning system 2, 7, respectively. After this, the first scanning system 1 is lifted. Now, e.g., the right scanning system 2 is active. By means of the wide carrying wheels 3, shown in FIGS. 5 and 6, the car can roll on both track gauges 4, 6. Now, the distance of the two wheels of the first scanning system 1 is adjusted in the lifted state to the new track gauge, and the scanning system is subsequently lowered again. After this, the scanning system 2 is lifted again, and the car acts again like conventional cars with this track gauge. FIG. 5 schematically illustrates the two scanning systems 1 and 7 in the respective lifted position and the second scanning system 2 in the respective lowered position on the guidance rail 5 that is also shown in FIGS. 1 to 4. The wide carrying wheels 3, which roll on the rails 4 or 6, are further schematically illustrated by small rectangles in FIG. 6 and are part of a synchrotrain car that is schematically illustrated by the large rectangle containing the carrying wheels 3 in FIG. 6.

The simplest form of a car of the synchrotrain is schematically shown in FIG. 6. Here, the scanning systems 2 and 7 are lifted, and only the first scanning system 1 moves the steering mechanism. Since under these conditions the rear wheels roll along a smaller radius than the front wheels, the rear wheels have to be slightly wider. The width depends on the length of the car and on the smallest curve radius. If the upper edge of the rail in a curve, however, is flush with the upper edge of the road, as for a tram, the width of the rear wheels can also be smaller. The rear wheels then do not roll on the rail any more but on the "road". The conducting system 15 comprises suitable scanning wheels, steering mechanism and the scanning systems influencing the steering mechanism.

Since in Europe alone, there are six different electric systems, a continuous energy supply when passing the borders is currently only possible with dual-system locomotives.

The transformation of the voltage from one system to any other one is technically possible already. Since each car needs only a fraction of the power of today's locomotives, the voltage transformer are smaller and lighter. Hence, all cars can be operated with one voltage, and only the voltage transformers need to be changed. The change of the voltage transformer could even take place during the ride by means of a service vehicle driving parallel to each car, taking over the drive of the car, and changing the voltage transformers. After this, the car supplies the power itself again, and the service vehicle disconnects again. The removed voltage transformer can then be used in a car of the traffic in opposite direction.

The functionality of the synchrotrain is apparent primarily in the area of a train station. FIG. 7 shows the basic structure of a train station which can be expanded as desired with increasing capacity. The concept of the train station is also designed in a manner that any number of cars can leave the main track back-to-back via a passive point 9 without creating a tailback on the main track. The number is only determined by the number of halt boxes 13. This is made possible in that after branching off from the main track 9, the speed is not reduced, but the same speed is maintained until after the next branch-off 10. Only every other car can turn off to the left since the speed is now reduced by half. For the cars rolling straight forward, there are only two possibilities. They either reduce their speed now as well by half, or proceed at full speed. In the second case, after turning-off 10 to the left, the conditions are always the same, which simplifies the logistics slightly and saves some running time. In addition, this provides more flexibility because it is not necessary that every other car rolling back-to-back has to turn off at the first possibility to turn off to the left. This, on the other hand, needs some more energy than the first variant. After the next branch-off 11, the speed is reduced again by half. This means that every other car rolling back-to-back has to turn off. For a synchronous speed of 200 km/h, this results now in 50 km/h. This speed can easily be reduced after a branch-off 12 to a stop in a halt box 13. It is also possible to introduce a further step.

The variant shown in FIG. 7 is the minimum form which, with empty halt boxes, already can receive 16 back-to-back rolling cars. The maximum configuration which could receive all cars at a synchronous speed of 200 km/h, a car length of 10 m, and an unloading and loading time of 30 s, needs approx. 168 halt boxes, hence always 42 instead of 4. When after unloading and loading on the main track, a free place is available (more details see below), the car is first accelerated to ¼ of the synchronous speed. After the branch-off 14 it is necessary to accelerate to half of the synchronous speed, and after the next branch-off to the full synchronous speed so that the car then does not affect the flow on the main track.

Figure 9:
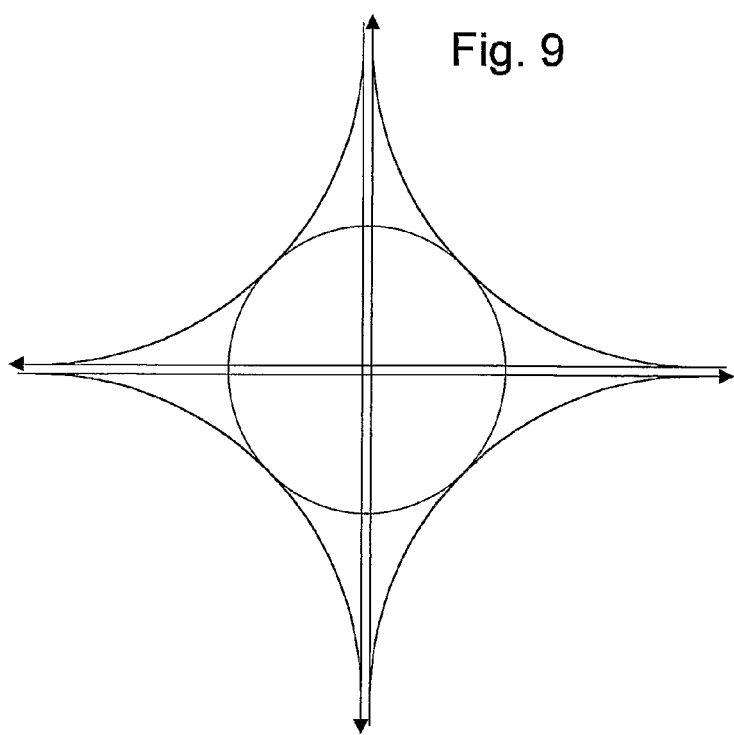
FIG. 9: As FIG. 8 and the possibility to turn

Crossings of tracks or branch-offs often include a severe change of direction. For high-speed tracks, the German Eisenbahnbauordnung stipulates, e.g., a minimum radius of 300 m. Since the synchrotrain requires the same speed everywhere, crossings of tracks or branch-offs cannot be built like today's motorway junctions. Due to the restriction of the minimum radii there are two variants of crossings. One is without FIG. 8 and the other one is with FIG. 9, the possibility to turn around. The second variant requires considerably more space since the right-hand turn lane must be provided with at least four times the radius of the one of the first version. The pictures are approximately on the same scale. Furthermore, it is questionable if the possibility to turn around on the main track with an automated operation is needed at all.

REFERENCE LIST

1 First scanning system with two wheels for the rails 4 of the conventional track
2 Second scanning system with one wheel for the guidance rail 5
3 Carrying wheels
4 The rails 4 of the conventional track (traction rails)
5 Guidance rail
6 Conventional rail with different track gauge
7 Third scanning system with one wheel for the guidance rail 5
8 Active part of the conventional active point
9 Passive point for turning into a train station
10 Passive points after which the speed is reduced by half
11 Passive points after which the speed is reduced by half, thus to ¼
12 Passive points for branching-off to individual halt boxes
13 Halt boxes arranged in parallel for parallel service
14 Passive points for bringing the cars together at ¼ of the target speed Conducting system comprising suitable scanning wheels, steering mechanisms and the scanning systems influencing the steering mechanism

The invention claimed is:

1. An active rail transport system for public, individualized and automated transport of persons and goods on conventional rails of a first conducting system that carries trains, the rails of the first conducting system having junctions where the rails change to different gauges, the system comprising:
   a second conducting system connected to the first conducting system by branch-off rails at active and passive points in the first and second conducting systems;
   a first guidance rail along an inside of each of the branch-off rails at the active and passive points;
   a second guidance rail along an outside of each of the branch-off rails at the active points;
   a third guidance rail along at least one side of each of the junctions where the rails change to a different gauge;
   a plurality of individual cars, each individual car having an autonomous drive unit, a brake and a steering mechanism, the steering mechanism including at least one steerable carrying axle;
   each individual car having a first mechanical scanning system for rolling along the first and second conducting systems, a second mechanical scanning system for rolling along guidance rails to the right of branch-off rails and at the junctions, and a third mechanical scanning system for rolling along guidance rails to the left of branch-off rails;
   each individual car having a mechanism for independently lowered and lifted each of the first, second and third scanning systems with respect to the individual car for engaging at least one rail when lowered and for disengaging all rails when lifted;
   at least one of the first, second and third scanning systems being lowered for steering the steerable carrying axle at a branch-off rail;
   each individual car having a mechanism of changing a spacing of the first scanning system to engaging the different gauge rails when at least one of the second and third scanning systems is lowered onto a guidance rail and during rolling of the individual car alone at least one of the first and second conducting systems;
   each individual car being adapted to decelerate for loading and unloading and to be redirected to another place of the first and second conducting system after a speed of the individual car has been adjusted to a speed of trains also rolling along the first and second conducting systems;
   the first mechanical scanning system of each individual car providing continuous traction along rails when not lifted; and
   the second and third mechanical scanning systems of each individual car, being arranged next to the first mechanical scanning system, on opposite sides of the car and being lowered for engaging a guidance rail for either changing a direction of the car when going over a branch-off rail or for maintaining a direction of the car when going over a branch-off rail.

2. The transport system according to claim 1, wherein at least one of the first and second guidance rails curves in the form of a clothoid.

3. The transport system according to claim 1, wherein for selection of a direction at a branch-off rail, a guidance rail is arranged on the right and on the left of the conventional rails of the conducting systems and at a distance therefrom.

4. The transport system according to claim 1, wherein the first scanning system is lifted from the conventional rails when going over diverge points of the conventional rail while the second scanning system or the third scanning system, depending on the change of direction, is lowered onto a guidance rail.

5. The transport system according to claim 1, wherein only in case of a change of direction, the first scanning system is lifted from the conventional rails when going over a passive diverge point or a crossing, respectively, while one of the two other scanning systems is lowered onto the guidance rails.

6. The transport system according to claim 1, wherein only front wheels of the car can be steered and rear wheels of the car are built wider.

7. The transport system according to claim 6, wherein the width of rear wheels of the car depend on an axis-center distance and the smallest curve radius.

8. The transport system according to claim 6, wherein for very small curve radii and low speed, the conventional rails are placed in the road area, and for a tram, the rear wheels roll on the road instead on the conventional rails.

9. The transport system according to claim 1, wherein the conventional rails are partially equipped with linear motors.

* * * * *